May 10, 1966  J. R. BEIL ETAL  3,250,382
TRASH COLLECTOR
Filed May 25, 1964
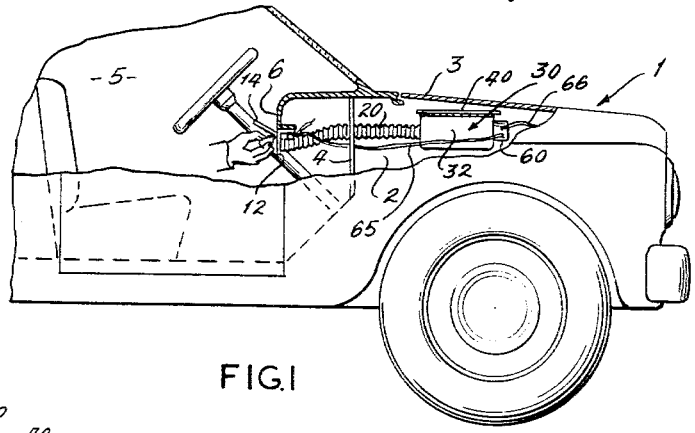
FIG.1
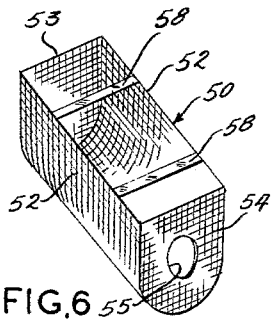
FIG.6
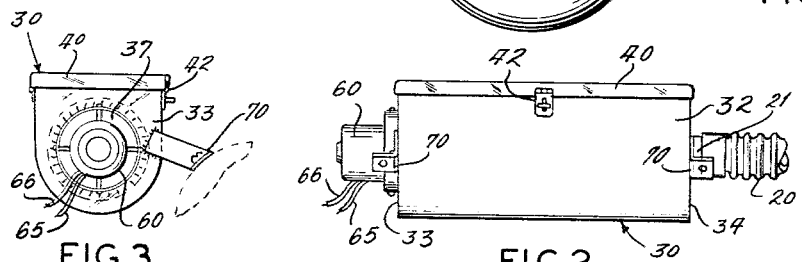
FIG.3   FIG.2   FIG.4
FIG.5
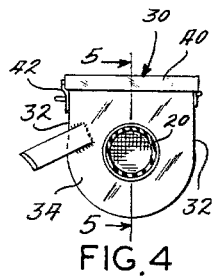
FIG.8
FIG.7
INVENTORS,
JOHN R. BEIL
SALVATORE D. SERRA
BY
ATTORNEY.

United States Patent Office 3,250,382
Patented May 10, 1966

3,250,382
TRASH COLLECTOR
John R. Beil, 138 Briarcliff, Granite City, Ill., and Salvatore D. Serra, 2130 Kappel, St. Louis, Mo.
Filed May 25, 1964, Ser. No. 369,798
8 Claims. (Cl. 206—19.5)

This invention relates to trash collecting systems for vehicles having passenger compartments. It has particular application to passenger automobiles, and will be described in that environment but its utility is not confined thereto.

The problem of littering of the streets and highways is becoming worse all the time. Not only are more people traveling, but packaging trends and materials invite more littering. Plastic and metal foil wrappings and containers, aluminum cans and lightweight, non-returnable bottles seem, as litter, almost indestructible. Accordingly, it is highly desirable to provide a convenient system of disposing of trash from the inside of the passenger compartment of a vehicle, without throwing it out the window.

One of the objects of this invention is to provide a trash disposal system which is simple and dependable, and which invites use by the occupants of the vehicle in which it is installed.

Another object is to provide such a system in which trash collected in its use can easily be removed.

Still another object is to provide such a system which may be installed in existing automobiles without any substantial structural changes in the automobile.

Other objects will become apparent to those skilled in the art in the light of the following description and accompanying drawing.

In accordance with this invention, generally stated, a trash collecting system is provided with a conduit which has a mouth immediately accessible from the interior of the vehicle. It may be, for example, and preferably is, mounted on or adjacent the dashboard of an automobile. The conduit is connected, mediately, to a means for producing a partial vacuum in the conduit. In the illustrative embodiments shown, these suction means take the form of a blower or impeller in a housing, and an electric motor by which the blower is driven. Between the conduit and the suction means is a foraminous basket, which communicates with both the conduit and the suction means. The basket has a trash-receiving opening which communicates with the conduit, and has foramina of such a size as to permit the passage of dust, tobacco ashes and the like, but to retain trash in the form of gum wrappers, cigarette packages, paper tissue, and larger objects. The basket may be made of screen wire, hardware cloth, perforated sheet metal, or any other suitable foraminous material.

The basket is removably mounted in a casing which is connected to and between the conduit and the suction means. The casing has a basket-receiving opening, through which the basket can be put in and taken out, and a closure for the opening. The basket is spaced from the casing through a large part of its area, to permit air to be drawn through the basket and between the basket and the casing, to the suction means. Barrier means are provided, coacting between the basket and the casing, and positioned between the conduit and the suction means, to prevent trash from getting into the space between the casing and the basket so as to by-pass the basket.

In the drawing, FIGURE 1 is a fragmentary view, partly broken away, of an automobile with one illustrative embodiment of trash collector of this invention installed in it;

FIGURE 2 is a fragmentary view in side elevation of the trash collector shown in FIGURE 1;

FIGURE 3 is a view in end elevation, looking rearwardly of the vehicle, of the trash collector shown in FIGURE 1;

FIGURE 4 is a view in end elevation of the part of the collector shown in FIGURE 2, viewed in a direction toward the forward end of the automobile;

FIGURE 5 is a sectional view taken along the line 5—5 of FIGURE 4;

FIGURE 6 is a view in perspective of the basket shown in FIGURE 5;

FIGURE 7 is a fragmentary enlarged detail view in perspective of the mouth end of the trash collector shown in FIGURE 1; and FIGURE 8 is a fragmentary view in perspective, partly broken away, of another embodiment of trash collector of this invention.

Referring now to the drawing, and particularly to FIGURES 1 through 7 for one illustrative embodiment of trash collector of this invention, reference numeral 1 indicates an automobile with an engine compartment 2 closed by a hood 3, a firewall 4, separating the engine compartment from a passenger compartment 5, and a dashboard 6.

Mounted on the dashboard 6, by means of a bracket 10, is the inner end of a conduit 20. The bracket 10 includes a shelf 11, through which bolts or other conventional fastening means, not here shown, are run to secure the bracket to the dash 6, a face plate 12, and, along the meeting edge of the shelf 11 and face plate 12, knuckles of a hinge 13. A lid 14, with knuckles complementary to those on the bracket 10, is mounted by means of a pintle, on the knuckles along the edge of the bracket. The face plate 12 has a hole 15 in it. The lid 14 is proportioned to close the hole 15 when it is in its normal position. The bracket 10 also carries an electric switch, a spring biased plunger 16 of which projects through and beyond the inside surface of the face plate 12. The gravity bias of the lid 14 is sufficient to depress the plunger 16 and open the circuit of which the switch is a part. When the lid 14 is raised manually, as shown in FIGURES 1 and 7, the plunger 16 moves out with the bias of its spring, to close the circuit.

The inner end of the conduit 20 is mounted on the opposite side of the face plate 12 from the lid 14, by means of a ferrule 17.

In the embodiment shown, the conduit 20 is made of corrugated rubber hose, preferably about three inches in effective inside diameter. This is convenient for installing the trash collector of this invention in existing automobiles. It can be seen that, particularly as original equipment, the trash collector can be provided with a relatively short, smooth bore tube, to facilitate the acceptance of cans and the like.

The other end of the conduit 20 is mounted on a pipe fitting 21, which, in reality, forms a continuation of the conduit 20, and is secured to and within an opening in a casing 30. The fitting 21 projects within the casing 30, to provide a rim 22. In the embodiment shown in FIGURES 1 through 5, the casing 30 is trough shaped, with a rounded bottom 31, parallel sides 32, a forward end 33, and a rearward end 34. The sides and ends define an open top, rectangular in outline. As can be seen from FIGURES 2, 3 and 4, the casing 30 is axially long relative to its height and width.

The open top of the casing 30 is selectively closed by means of a cover 40. The cover 40 is hinged to one of the sides 32, and is provided with a hasp 42, which cooperates with a fastener 36 on the other side 32 of the casing.

Removably mounted within the casing 30 is a foraminous basket 50. The basket 50 is shaped complementarily to the casing 30, but is smaller than the casing in every dimension. The basket 50 has a bottom 51, sides 52, a forward end wall 53 and a rearward end wall 54. The sides 52 and end walls 53 and 54 define an open top, rectangular in outline. Straps 58 across the top, serve as handles to facilitate lifting the basket. In the rearward end wall 54, there is a circular trash-receiving opening 55, which is so proportioned as to give a close fit on and about the rim 22 of the fitting 21, as shown particularly in FIGURE 5. Spacer feet 56 are welded to the bottom 51 of the basket. The spacer feet 56 cooperate with positioning lugs 36 on the inside surface of the bottom 31 of the casing 30.

As can be seen from FIGURE 5, the basket 50 fits closely against the underside of the cover 40 and terminates a substantial distance short of the forward wall 33 of the casing 30. The forward wall 33 is provided with a circular opening 37 defined by an axially extending annular flange 38. In the illustrative embodiment shown in FIGURES 3 and 5, an electric motor 60 is mounted in the opening 37 by means of four struts 61, the radially outer ends of which are riveted to the inside surface of the flange 38, and the radially inner ends of which are connected, as by a motor-encircling band, not here shown, to the motor 60. The motor 60 projects through the opening 37 and into the inside of the casing 30. A shaft 62 on the motor 60 carries a bladed impeller 63 which is housed between the end 33 of the casing and the end 53 of the basket. The pitch of the blades of the impeller 63 and the direction of rotation of the shaft 62 are such as to force air out through the opening 37, from the interior of the casing 30 when the motor is energized.

Conductors 65 and 66 are electrically connected to the motor 60, and to the battery of the automobile, by way of the switch of which the plunger 16 is a part, and to ground, respectively.

Mounting brackets 70 are secured to the ends 33 and 34 of the casing, and are so constructed as to permit their attachment to the body of the automobile by bolts extending through holes which may be drilled in the wall of a fender well, so that the casing, hence the motor 60 and impeller 63, may be mounted under the hood by a simple bolting operation.

In the installation of this embodiment of trash collector, the casing is mounted under the hood by means of the mounting brackets 70. The bracket 10 is mounted on the dashboard, a hole is cut in the firewall, and the conduit 20 is strung through the hole and connected at its inner end to the ferrule 17 on the bracket 10, and at its other end to the fitting 21 of the casing. The wire 66 is connected to ground; the wire 65, to the switch mounted on the bracket 10, hence to the hot side of the battery.

In the operation of the device, the lid 14 is raised manually, which permits the switch to close, the motor 60 starts, the impeller 63 creates a partial vacuum in the conduit 20, and trash placed at the mouth of the conduit 20 is sucked into the basket 50 while dust, cigarette ashes and the like goes on through the foramina of the basket and out the hole 37. When the lid 14 is dropped, it moves the plunger 16 against the bias of the spring, which opens the switch and stops the motor. In this way, the operation of the device is independent of the movement of the automobile, the running of the engine or any other factor except the condition of the battery.

When trash has accumulated in the basket 50, it is only necessary to open the cover 40, and lift out the basket 50. In the arrangement of the embodiment shown in FIGURE 5, the forward end of the basket can be lifted just far enough so that the foot 56 clears the lug 36, then the basket can be moved toward the impeller far enough to clear the rim 22 and be lifted directly from the casing. It is replaced in the reverse sequence.

In the embodiment shown in FIGURE 8, a cylindrical casing 80 is provided, designed to be mounted vertically. The casing 80 has a cover 90 at its upper end, and a fitting 121 is mounted to project radially from the casing 80 just below the cover 90. In this embodiment there is no rim on the inside of the casing corresponding to the rim 22. The barrier between the fitting, i.e. the open end of the conduit, and the space around the basket, constituted in the first embodiment by the rim 22, is constituted in the embodiment shown in FIGURE 8 by a flange 152 projecting radially from the upper edge of a cylindrical foraminous basket 150. The basket 150 has a bail 158 at its upper end, by which it can be lifted out and replaced, and a circular foraminous lower end 154, which rests on feet 155 which serve as spacers from a bottom 83 of the casing 80. In this embodiment, an impeller, not here shown, is contained within a separate housing 170, which is mounted directly on the bottom end 83 of the casing 80 and which communicates with the interior of the casing 80 through an opening 84 in the bottom 83 of the casing. A motor 160 drives the impeller and is connected electrically in the same way as the motor 60. The remaining elements of this embodiment of trash collector are the same as those of the embodiment shown in FIGURES 1 through 7.

The casing and motor of the embodiment shown in FIGURE 8 are particularly adapted to use in automobiles in which there is a vertical space available, and, where such a space can be found, is preferred because of the simplicity of its construction.

Numerous variations in the construction of the trash collector of this invention, within the scope of the appended claims, will be apparent to those skilled in the art in the light of the foregoing disclosure.

Having thus described the invention, what is claimed and desired to be secured by Letters Patent is:

1. A trash collector for vehicles having a passenger compartment, comprising conduit means having a mouth immediately accessible from the interior of said passenger compartment; suction means outside said compartment, operatively connected to said conduit to produce a partial vacuum therein; a foraminous basket positioned between said suction means and said conduit means and in communication with both said means, said basket having a trash-receiving opening in communication with said conduit means and foramina of such size as to permit the passage of dust, tobacco ashes and the like; a basket-enclosing casing connected to and between said suction means and said conduit means, said basket being removably mounted within said casing and said casing having a basket-receiving opening through which the basket can be mounted in and demounted from the casing; spacing means between said basket and said casing for spacing a substantial area of said basket from the said casing; barrier means coacting between said casing and said basket and located between the said conduit and the said suction means for preventing by-passing of said basket by trash; closure means on said casing, manipulable selectively to close and open the said basket receiving opening, and mounting means on said casing adapted to mount the casing outside the passenger compartmet of said vehicle.

2. The trash collector of claim 1 wherein the basket and casing are long axially as compared with their width and height, said mounting means are adapted to mount the casing horizontally, and the casing opening and the closure therefor extend lengthwise of the casing.

3. The trash collector of claim 2 wherein the suction means comprises an electric motor and an impeller mounted on a shaft of said motor, said motor being mounted on one axial end of said casing.

4. The trash collector of claim 2 wherein the basket is provided with a lengthwise-extending trash-removing opening and sealing means are provided coacting between said basket and said casing for preventing the escape of trash through said opening when the casing opening is closed.

5. The trash collector of claim 1 wherein the said basket and casing are long axially as compared with their width and depth, the said mounting means are adapted to mount the casing vertically, and the closure for the casing is mounted at the upper end thereof.

6. The trash collector of claim 5 wherein the suction means comprise a blower and an electric motor, said blower having a housing connected to said casing and said motor being mounted on said housing, said housing being mounted at the lower end of said casing.

7. The trash collector of claim 5 wherein the basket is substantially shorter than the casing and said conduit communicates with the interior of said casing above an opening in said basket which constitutes both said trash-receiving opening and a trash-removing opening, and below said closure.

8. A trash collector for vehicles having a passenger compartment, comprising conduit means having a mouth immediately accessible from the interior of said passenger compartment; a hollow, open-topped casing, long in relation to its width and depth, mounted vertically on said vehicle outside said passenger compartment and communicating through a vertical side near its top, with said conduit means; suction means mounted on the bottom of said casing and communicating with the interior of said casing; a foraminous basket removably mounted within said casing, said basket being smaller in every dimension than said casing, and having on open top positioned below the area of communication of said casing and conduit; spacing means below said basket for spacing the bottom of the basket from the bottom of the casing; barrier means positioned between the casing and the basket and adjacent the top of the basket for preventing by-passing of the basket by trash, and removable closure means for the top of said casing.

References Cited by the Examiner

UNITED STATES PATENTS

| 313,453 | 3/1885 | Rutter | 220—19 |
| 2,299,668 | 10/1942 | Webster | 206—19.5 |
| 2,823,799 | 2/1958 | Gangell | 206—19.5 |
| 2,851,156 | 9/1958 | Thompson | 206—19.5 |
| 2,891,662 | 6/1959 | Frost | 206—19.5 |

THERON E. CONDON, *Primary Examiner.*

W. T. DIXSON, *Assistant Examiner.*